US011050743B2

(12) United States Patent
Liu et al.

(10) Patent No.: US 11,050,743 B2
(45) Date of Patent: Jun. 29, 2021

(54) SYSTEMS AND METHODS OF ENABLING FAST USER ACCESS TO REMOTE DESKTOPS

(71) Applicant: Citrix Systems, Inc., Fort Lauderdale, FL (US)

(72) Inventors: Lei Liu, Nanjing Jiangsu (CN); Yeping Liu, Nanjing Jiangsu (CN); Cao Lei, Nanjing Jiangsu (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 106 days.

(21) Appl. No.: 16/466,524

(22) PCT Filed: Jan. 29, 2019

(86) PCT No.: PCT/CN2019/073716
§ 371 (c)(1),
(2) Date: Jun. 4, 2019

(87) PCT Pub. No.: WO2020/154898
PCT Pub. Date: Aug. 6, 2020

(65) Prior Publication Data
US 2020/0389449 A1    Dec. 10, 2020

(51) Int. Cl.
*H04L 29/06* (2006.01)
*G06F 9/451* (2018.01)
(Continued)

(52) U.S. Cl.
CPC .......... *H04L 63/0853* (2013.01); *G06F 9/452* (2018.02); *H04L 41/22* (2013.01); *H04L 67/42* (2013.01); *G06F 3/04817* (2013.01)

(58) Field of Classification Search
CPC ..... H04L 63/0853; H04L 41/22; H04L 67/42; G06F 9/452; G06F 3/04817
See application file for complete search history.

(56) References Cited

U.S. PATENT DOCUMENTS 6,167,435 A * 12/2000 Druckenmiller .... G06F 16/9535
709/206
8,739,252 B2 * 5/2014 Kuang .................... H04L 63/08
726/4
(Continued)

FOREIGN PATENT DOCUMENTS

CN          1455372 A      11/2003
CN          1932786 A       3/2007
(Continued)

OTHER PUBLICATIONS

Notification of Transmittal of the International Search Report and the Written Opinion of the International Searching Authority, or the Declaration, dated Nov. 1, 2019, by the International Searching Authority for International Application No. PCT/CN2019/073716, International Filing Date: Jan. 29, 2019, 8 pages.
(Continued)

*Primary Examiner* — Arvin Eskandarnia
(74) *Attorney, Agent, or Firm* — BainwoodHuang

(57) ABSTRACT

Techniques for enabling fast user access to the desktop computing environment of a remote computer via a user device in response to notification of a change in the display screen of the remote computer. The techniques include specifying an area of the display screen, setting a policy for determining whether to notify a subscribed user of a change within the specified display screen area, generating a notification packet containing information for validating the subscribed user and establishing a connection to the remote computer, encrypting the notification packet, sending or pushing the notification packet to the user device of the subscribed user, decrypting the notification packet, extracting the information for validating the subscribed user and establishing the connection from the notification packet, and constructing and rendering an image of a shortcut icon on a
(Continued)

display of the user device for providing fast user access to the remote computer desktop computing environment.

20 Claims, 9 Drawing Sheets

(51) Int. Cl.
*H04L 12/24* (2006.01)
*G06F 3/0481* (2013.01)

(56) References Cited

U.S. PATENT DOCUMENTS

| | | | |
|---|---|---|---|
| 9,535,567 B1* | 1/2017 | Bagrinovskiy | G06F 3/033 |
| 9,985,786 B1 | 5/2018 | Bhabbur et al. | |
| 2002/0035627 A1 | 3/2002 | Sutou et al. | |
| 2004/0117451 A1* | 6/2004 | Chung | H04L 51/14 709/207 |
| 2004/0148385 A1* | 7/2004 | Srinivasan | H04L 41/0253 709/224 |
| 2007/0005607 A1* | 1/2007 | Fukuta | G06F 21/83 |
| 2013/0067344 A1 | 3/2013 | Ungureanu et al. | |
| 2013/0125009 A1* | 5/2013 | DeLuca | H04L 67/08 715/740 |
| 2016/0099948 A1 | 4/2016 | Ott et al. | |
| 2018/0124151 A1* | 5/2018 | Haizmann | H04L 67/025 |
| 2018/0205701 A1* | 7/2018 | Kakhandiki | G06F 8/65 |
| 2018/0373550 A1* | 12/2018 | Fuse | G06F 3/0486 |

FOREIGN PATENT DOCUMENTS

| | | |
|---|---|---|
| CN | 101350865 A | 1/2009 |
| CN | 101420610 | 4/2009 |
| CN | 101651743 A | 2/2010 |
| GB | 2559550 | 8/2018 |
| JP | 2004302551 | 10/2004 |

OTHER PUBLICATIONS

"Automate Windows with Mouse and Keyboard Automation Software", http://tutorials.automouseclick.com/automatic-screen-change-detection/, available on Jan. 24, 2019 as per Wayback Machine, pp. 1-6.

Anonymous; "How to Get Started With Timeviewer Remote Control," Apr. 10, 2018, XP055692749, Retrieved from the Internet: URL: http://web.archive.org/web/20180410171808/https://community.teamviewer.com/t5/commmunity-blog/How-to-get-started-with-teamviewer-remote-control/ba-p/4190 [retrieved on May 7, 2020], pp. 1-3.

Anonymous; "VISUALPING: #1 Website change detection, monitoring and alerts," Jan. 28, 2019, XP055692975, Retrieved form the Internet: URL: https://web.archive.org/web/20190128104252/https://visualping.io/ [retrieved on May 8, 2020], p. 1.

* cited by examiner

SYSTEMS AND METHODS OF ENABLING FAST USER ACCESS TO REMOTE DESKTOPS

BACKGROUND

Users of personal computers and/or mobile devices frequently engage in remote desktop access to display desktop environments of remote computers on their respective computers and/or devices. Such remote desktop access typically provides a user with access to the entire desktop of a remote computer, transferring user interfaces of the desktop to the user's personal computer or mobile device, while allowing one or more application programs and/or other software programs to execute on the remote computer. To engage in remote desktop access in a secure fashion, the user of the personal computer or mobile device typically presents at least one authentication token to a token authenticator for validation to establish his or her identity. Once the identity of the user is established and validated to the satisfaction of the token authenticator, access to the desktop of the remote computer is permitted via the user's personal computer or mobile device.

SUMMARY

Oftentimes, a business owner, employee, or other individual will launch or otherwise initiate execution of an application program on his or her office computer, and then decide to leave the office for the day while the application program continues to execute on the office computer. Such may be the case when an application program is performing complex calculations or other actions, which require an extended period of time to complete. While away from the office, the business owner or employee may wish to check on the execution progress of the application program to determine whether such complex calculations or other actions have completed and/or whether further steps need to be taken to assure their completion. To that end, the business owner or employee may repeatedly perform remote access operations, including repeatedly establishing and validating his or her identity to remotely access the desktop of the office computer via his or her personal computer or mobile device. However, having to repeatedly perform remote access operations to check on the execution progress of an application or other software program executing on an office computer may not only be inconvenient to a business owner or employee, but also a highly inefficient use of the business owner or employee's time and/or computer resources.

Techniques are disclosed herein for enabling fast user access to the desktop environment of a remote computer via a user device, in response to a notification of a change in the display screen of the remote computer. The term "fast user access" or "fast access" is employed herein to refer to the capability of a user to establish a connection over a network and/or gateway between a user device (e.g., a personal computer or mobile device) and a remote computer using a minimal number of steps, such as by tapping, clicking, and/or selecting a shortcut (or launch) icon on the display screen of the user device. The disclosed techniques can include specifying a defined area of the display screen of the remote computer, and setting a notification policy for determining whether to notify the user of the personal computer or mobile device of a change within the defined area of the display screen. Such a notification policy can include notifying the user in the event at least a portion of the defined area of the display screen changes, stops changing, and/or changes to substantially match a display image (e.g., a predefined image) based on a percentage of similarity between the portion of the defined area and the display image. Once the notification policy has been triggered, the disclosed techniques can further include generating a notification packet containing information for validating the user and establishing a connection to the remote computer.

Having validated the user, the disclosed techniques can further include encrypting the notification packet, and sending or pushing the notification packet to the user's personal computer or mobile device. Upon receipt of the notification packet at the personal computer or mobile device, the disclosed techniques can further include (i) decrypting the notification packet, (ii) extracting, from the notification packet, the information for establishing the connection to the remote computer, and (iii) rendering an image of a shortcut (or launch) icon on the display screen of the personal computer or mobile device for providing fast access to the desktop of the remote computer using the extracted connection information. By enabling such fast user access to the desktop environment of a remote computer via a personal computer or mobile device in response to a notification of a change in the display screen of the remote computer, a user of the personal computer or mobile device can more conveniently determine the progress of an application or other software program executing on the remote computer, while avoiding performing repeated, inefficient, and often time-consuming remote access operations.

In certain embodiments, a method of providing access to a remote computer includes determining a status of an application executable on the remote computer based on an image on a display screen of the remote computer. The method further includes, having determined the status of the application, sending, to a user device, a notification packet, the notification packet containing information for establishing a secure connection from the user device to the remote computer to provide access to a desktop computing environment of the remote computer via the user device.

In certain arrangements, the method further includes setting, in response to a user input, a notification policy for determining whether to notify the user device of a change in the display screen of the remote computer, and specifying a defined area of the display screen of the remote computer, in which the setting of the notification policy includes setting the notification policy for determining whether to notify the user device of the change within the specified defined area of the display screen of the remote computer.

In certain arrangements, the setting of the notification policy further includes setting the notification policy to one of notifying the user device when at least a portion of the display screen within the specified defined area starts or stops changing.

In certain arrangements, the setting of the notification policy further includes setting the notification policy to one of notifying the user device when a portion of the display screen within the specified defined area changes to match a predefined image.

In certain arrangements, the determining of the status of the application executable on the remote computer includes monitoring for changes within the specified defined area of the display screen of the remote computer.

In certain arrangements, the determining of the status of the application executable on the remote computer further includes capturing bitmap data corresponding to the specified defined area of the display screen, and comparing the captured bitmap data with bitmap data of the predefined image to obtain a similarity percentage between the respective bitmap data.

In certain arrangements, the determining of the status of the application executable on the remote computer further includes comparing the similarity percentage with a threshold.

In certain arrangements, the method further includes receiving, at the remote computer, a subscription request for subscribing to a notification event pertaining to a change in the display screen of the remote computer, and, in response to the subscription request, authenticating the user device and/or a user of the user device. The method further includes, having authenticated the user device and/or the user of the user device, sending a security subscription token to the user device.

In certain arrangements, the method further includes sending a security subscription token request to the user device, and, in response to the security subscription token request, receiving, at the remote computer, the security subscription token from the user device.

In certain arrangements, the method further includes validating the security subscription token received from the user device, in which the sending of the notification packet to the user device includes sending the notification packet in response to the security subscription token having been validated.

In certain arrangements, the sending of the notification packet to the user device includes sending the notification packet that further contains a security launch token.

In certain arrangements, the method further includes, having sent the notification packet to the user device, receiving, at the remote computer, a launch request for launching the desktop computing environment of the remote computer on the user device.

In certain arrangements, the method further includes, in response to receiving the launch request, sending a security launch token request to the user device, and, in response to the security launch token request, (i) receiving, at the remote computer, the security launch token from the user device, and (ii) validating the security launch token received from the user device.

In certain arrangements, the method further includes, having validated the security launch token, authenticating the user of the user device, and, having authenticated the user of the user device, sending desktop graphics data to the user device for use in displaying at least a portion of the desktop computing environment of the remote computer on the user device.

In certain embodiments, a system for providing access to a remote computer includes a memory, and at least one processor configured to execute at least one computer program out of the memory (i) to determine a status of an application executable on the remote computer based on an image on a display screen of the remote computer, and (ii) having determined the status of the application, sending, to a user device, a notification packet, the notification packet containing information for establishing a secure connection from the remote computer to the user device to provide access to a desktop computing environment of the remote computer via the user device.

In certain arrangements, the processor is further configured to execute the computer program out of the memory (i) to specify a defined area of the display screen of the remote computer, and (ii) to set a notification policy for determining whether to notify the user device of the change within the specified defined area of the display screen of the remote computer.

In certain embodiments, a computer program product includes a set of non-transitory, computer-readable media having instructions that, when executed by processing circuitry of a computerized apparatus, cause the processing circuitry to perform a method of providing access to a desktop computing environment of a remote computer, in which the method includes determining a status of an application executable on the remote computer based on an image on a display screen of the remote computer. The method further includes, having determined the status of the application, sending, to the user device, a notification packet, the notification packet containing information for establishing a secure connection from the remote computer to the user device to provide access to a desktop computing environment of the remote computer via the user device.

In certain arrangements of the computer program product, the method further includes setting, in response to a user input, a notification policy for determining whether to notify a user device of a change in the display screen of the remote computer, and specifying a defined area of the display screen of the remote computer. In such arrangements, the setting of the notification policy includes setting the notification policy for determining whether to notify the user device of the change within the specified defined area of the display screen of the remote computer.

In certain embodiments, a method of accessing a remote computer includes setting a notification policy for determining whether a user device is to be notified via a notification packet of a change in an image on a display screen of the remote computer, and receiving the notification packet at the user device containing information for providing access to a desktop computing environment of the remote computer via the user device.

In certain arrangements, the method further includes sending a security fast-launch token to the remote computer, and providing user credentials to establish a secure connection with the remote computer.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

FIG. 1b is a block diagram of the subscriber device of FIG. 1a;

FIG. 1c is a block diagram of the remote computer of FIG. 1a;

DETAILED DESCRIPTION

Techniques are disclosed herein for enabling fast user access to the desktop environment of a remote computer via a personal computer or mobile device, in response to a notification of a change in the display screen of the remote computer. The disclosed techniques can include specifying a defined area of the display screen of the remote computer, and setting a notification policy for determining whether to notify a user of the personal computer or mobile device of a change within the defined area of the display screen. Once the notification policy has been triggered, the disclosed techniques can further include generating a notification packet containing at least information for validating the user and establishing a connection to the remote computer. Having validated the user, the disclosed techniques can further include encrypting the notification packet, and sending or pushing the notification packet to the user's personal computer or mobile device. Upon receipt of the notification packet at the personal computer or mobile device, the disclosed techniques can further include (i) decrypting the notification packet, (ii) extracting, from the notification packet, the information for establishing the connection to the remote computer, and (iii) rendering an image of a shortcut (or launch) icon on the display of the personal computer or mobile device for providing fast access to the desktop of the remote computer using the extracted connection information.

Figure 1A:
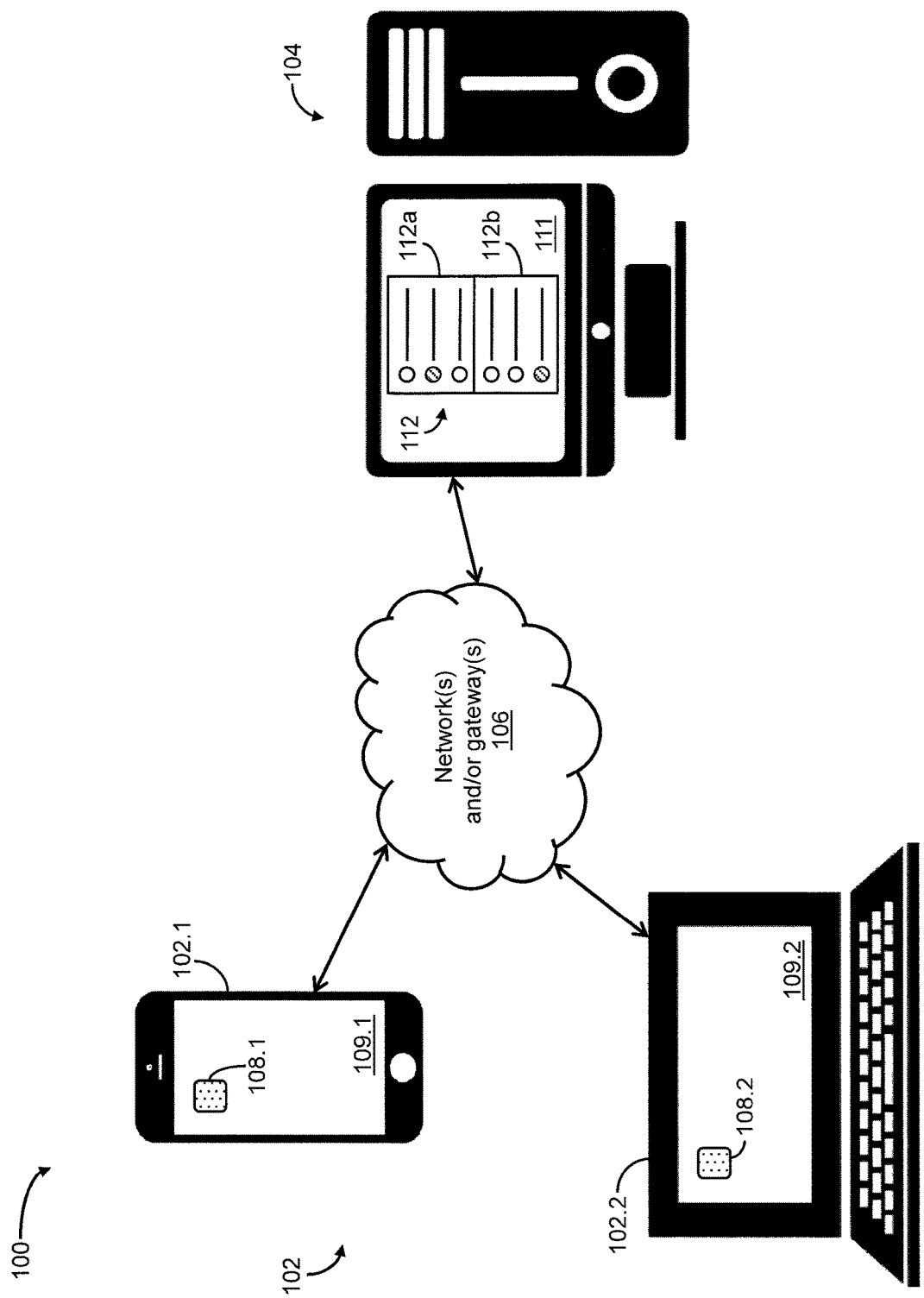
FIG. 1a is a diagram illustrating an exemplary network environment, in which techniques can be practiced for enabling fast user access to the desktop environment of a remote computer via a subscriber device, in response to a notification of a change in the display screen of the remote computer.

FIG. 1a depicts an illustrative embodiment of an exemplary network environment 100, in which techniques can be practiced for enabling fast user access to the desktop environment of a remote computer via a subscriber device, in response to a notification of a change in the display screen of the remote computer. As shown in FIG. 1a, the network environment 100 can include at least one subscriber device 102 (such as a mobile device 102.1 and/or a laptop computer 102.2), a remote computer 104, and one or more networks and/or gateways 106 configured to communicably connect the mobile device 102.1 and/or the laptop computer 102.2 to the remote computer 104. The mobile device 102.1 can include a display screen 109.1 (e.g., a touchscreen), and the laptop computer 102.2 can include a display screen 109.2. Likewise, the remote computer 104 can include a display screen 111. For example, the mobile device 102.1 may be configured to construct and render at least one shortcut (or launch) icon 108.1 on its display screen 109.1, and the laptop computer 102.2 may also be configured to construct and render at least one shortcut (or launch) icon 108.2 on its display screen 109.2, for use in enabling users of the respective subscriber devices 102.1, 102.2 to obtain fast user access to a desktop environment 112 of the remote computer 104. Further, the remote computer 104 may be configured to construct and render on its display screen 111 at least the desktop environment 112, which may include a group of radio buttons 112a, a group of status indicators 112b, and/or any other suitable graphical components of the desktop environment 112. It is noted that the subscriber device(s) 102 can be embodied as one or more smartphones, laptop computers, tablet computers, desktop computers, wearable devices, and/or any other suitable phones, computers, or computerized devices. Further, the remote computer 104 can be embodied as a desktop computer, a server computer, a workstation virtual machine, and/or any other suitable physical computer or virtual machine.

Figure 1C:
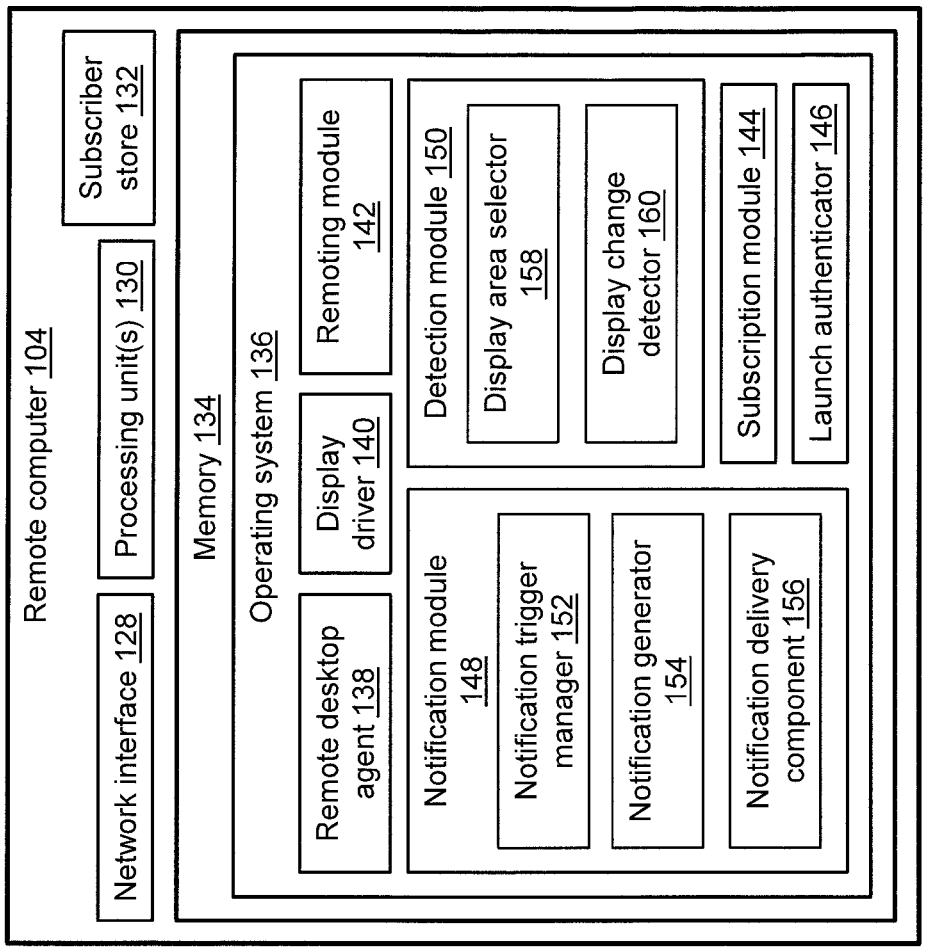
Figure 1B:
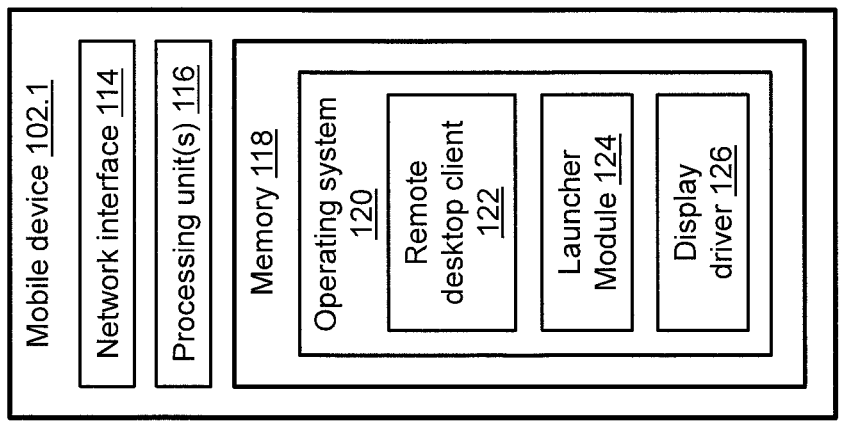

FIG. 1b depicts a detailed view of the mobile device 102.1 of FIG. 1a. As shown in FIG. 1b, the mobile device 102.1 can include a network interface 114, one or more processing units 116, and a memory 118. The network interface 114 can be configured to connect the mobile device 102.1 to the network(s) and/or gateway(s) 106 (see FIG. 1a), which can include one or more wired and/or wireless communications networks (e.g., local area networks (LANs), metropolitan area networks (MANs), wide area networks (WANs), the Internet), firewalls, and/or gateway servers. The memory 118 can be configured to include volatile storage (e.g., dynamic random access memory (DRAM), static random access memory (SRAM)) and/or non-volatile storage (e.g., flash memory). As shown in FIG. 1b, the memory 118 can also be configured to store a variety of software constructs, including an operating system (OS) 120, as well as a remote desktop client 122, a launcher module 124, and a display driver 126 running on the OS 120. For example, the remote desktop client 122 may be implemented using the Citrix Receiver™ client component of the Citrix Virtual Apps and Desktops software, or any other suitable client-side component software. The Citrix Receiver™ client component software and the Citrix Virtual Apps and Desktops software are each sold by Citrix Systems, Inc., Fort Lauderdale, Fla. USA. The launcher module 124, when executed by the processing unit(s) 116, can provide a security fast-launch token and user credentials to a launch authenticator 146 (see FIG. 1c) of the remote computer 104 for use in determining whether a user of the mobile device 102.1 is authorized to obtain fast access to the desktop of the remote computer 104 via the mobile device 102.1. The display driver 126 can provide interface functionality between the processing unit(s) 116 and the display screen 109.1 for constructing and rendering the shortcut (or launch) icon 108.1 on the display screen 109.1, as well as initiating fast user access to the desktop environment 112 of the remote computer 104 via actuation (e.g., tapping, clicking, selecting) of the shortcut (or launch) icon 108.1. In accordance with various alternative embodiments, the remote desktop client 122, the launcher module 124, and/or the display driver 126 can be implemented using any suitable hardware, software, or firmware configuration(s), or any suitable combination thereof. The processing unit(s) 116 can be configured to operate in accordance with the various software constructs stored in the memory 118, and can be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof. It is noted that the laptop computer 102.2 of FIG. 1a can likewise include suitable hardware and software modules and/or components for implementing the techniques described herein.

FIG. 1c depicts a detailed view of the remote computer 104 of FIG. 1a. As shown in FIG. 1c, the remote computer 104 can include a network interface 128, one or more processing units 130, a subscriber store 132, and a memory 134. Like the network interface 114 of the mobile device 102.1, the network interface 128 can be configured to connect the remote computer 104 to the network(s) and/or gateway(s) 106 (see FIG. 1a). Further, like the memory 118 of the mobile device 102.1, the memory 134 of the remote computer 104 can be configured to include volatile storage (e.g., DRAM, SRAM) and/or non-volatile storage (e.g., flash memory). As shown in FIG. 1c, the memory 134 can also be configured to store a variety of software constructs, including an operating system (OS) 136, as well as a remote desktop agent 138, a display driver 140, a remoting module 142, a subscription module 144, the launch authenticator 146, a notification module 148, and a detection module 150 running on the OS 136. The notification module 148 can include a notification trigger manager 152, a notification generator 154, and a notification delivery component 156. The detection module 150 can include a display area selector 158, and a display change detector 160. For example, the remote desktop agent 138 may be implemented using the Citrix Virtual Apps and Desktops software, or any other suitable software. The display driver 140 can provide interface functionality between the processing unit(s) 130 and the display screen 111 for constructing and rendering the desktop environment 112 on the display screen 111, detecting a change in the display screen 111, and specifying a defined area of the display screen 111. The functionality of each of the remote desktop agent 138, the remoting module 142, the subscription module 144, the launch authenticator 146, the notification module 148, and the detection module 150 is described hereinbelow with reference to an illustrative example, in which a business owner or employee desires to check on the progress or status of an application program executing on an office computer using his or her mobile device. In accordance with various alternative embodiments, the remote desktop agent 138, the display driver 140, the remoting module 142, the subscription module 144, the launch authenticator 146, the notification module 148, and the detection module 150 can be implemented using any suitable hardware, software, or firmware configuration(s), or any suitable combination thereof. The processing unit(s) 130 can be configured to operate in accordance with the various software constructs stored in the memory 134. Like the processing unit(s) 116 of the mobile device 102.1, the processing unit(s) 130 of the remote computer 104 can be implemented in a variety of ways, using one or more processors running specialized software, one or more ASICs, one or more FPGAs, one or more discrete components, digital circuits, analog circuits, and so on, or any suitable combination thereof.

Techniques are disclosed herein for enabling fast user access to the desktop environment 112 of the remote computer 104 via the respective subscriber device(s) 102 (e.g., the mobile device 102.1, the laptop computer 102.2), in response to a notification of a change in the display screen 111 of the remote computer 104. The disclosed techniques can include specifying a defined area of the display screen 111 of the remote computer 104, and setting a notification policy for determining whether to notify a user of the mobile device 102.1 of a change within the defined area of the display screen 111. Such a notification policy can include notifying the user in the event at least a portion (e.g., an image) of the defined area of the display screen 111 changes, stops changing, and/or changes to substantially match a display image (e.g., a predefined image) based on a percentage of similarity between the portion of the defined area and the display image. Such a change in the portion of the defined area of the display screen 111 can be indicative of the progress or status of an application or other software program executing on the remote computer 104. Once the notification policy has been triggered, the disclosed techniques can further include generating a notification packet containing at least information for validating the user of the mobile device 102.1 and establishing a connection to the remote computer 104.

Having validated the user, the disclosed techniques can further include encrypting the notification packet, and sending or pushing the notification packet to the mobile device 102.1. Upon receipt of the notification packet at the mobile device 102.1, the disclosed techniques can further include (i) decrypting the notification packet, (ii) extracting, from the notification packet, the information for establishing the connection to the remote computer 104, and (iii) rendering an image of a shortcut (or launch) icon on the display screen 109.1 of the mobile device 102.1 for providing fast user access to the desktop environment 112 of the remote computer 104 using the extracted connection information. By enabling such fast access to the desktop of the remote computer 104 via the mobile device 102.1 in response to a notification of a change in the display screen 111 of the remote computer 104, the user of the mobile device 102.1 can more conveniently determine the progress or status of the application or other software program executing on the remote computer 104, while avoiding performing repeated, inefficient, and often time-consuming remote access operations.

The disclosed techniques for enabling fast user access to the desktop environment of a remote computer via a subscriber device in response to a notification of a change in the display screen of the remote computer will be further understood with reference to the following illustrative example, as well as FIGS. 1a-1c, 2, and 3a-3e. In this example, it is assumed that a business owner or employee launches or otherwise initiates execution of an application program on his or her office computer (e.g., a remote office computer 302; see FIGS. 3a-3c), and then decides to leave the office for the day while the application program executes on the office computer 302. Such may be the case when the application program is performing complex calculations or other actions, which require an extended period of time to complete. While away from the office, the business owner or employee may wish to check on the execution progress of the application program to determine whether such complex calculations or other actions have completed and/or whether further steps need to be taken to assure their completion. FIGS. 3a-3e depict diagrams illustrating an exemplary scenario for practicing the disclosed techniques, which can allow the business owner or employee to check on the progress of the application program executing on the office computer 302 (see FIGS. 3a-3c) using his or her mobile device 314 (see FIGS. 3d and 3e). It is noted that the office computer 302 of FIGS. 3a-3c can be configured like the remote computer 104 of FIG. 1c, and that the mobile device 314 of FIGS. 3d and 3e can be configured like the mobile (subscriber) device 102.1 of FIG. 1b.

Having launched or initiated the execution of the application program on the office computer 302, the business owner or employee, using his or her mobile device 314, subscribes to a notification event pertaining to a display screen 304 of the office computer 302, namely, a detected change in at least a portion of a desktop environment of the office computer 302 displayed on the display screen 304. To assure that only authorized individuals are permitted to subscribe to such a notification event, the business owner or employee, using the mobile device 314, engages in a subscription process that involves receiving a security subscription token from the subscription module 144 running on the OS 136 of the office computer 302, as described in detail later in this disclosure with reference to FIG. 4a. Once the business owner or employee has successfully subscribed to the notification event, he or she interacts with the display area selector 158 (see FIG. 1c) of the detection module 150 running on the OS 136 of the office computer 302 to specify a defined area of the display screen 304 within which at least one change in the display screen 304 is to be detected, thereby determining whether a selected notification policy has been triggered.

Figure 3A:
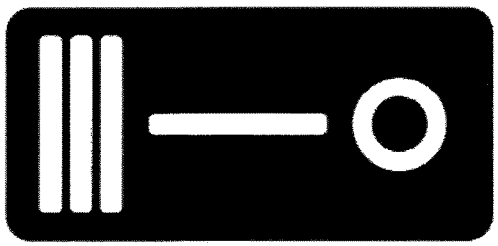
FIGS. 3a-3e are diagrams illustrating an exemplary scenario for practicing the techniques of FIG. 1a, involving a remote computer and a subscriber device.
Figure 3A:
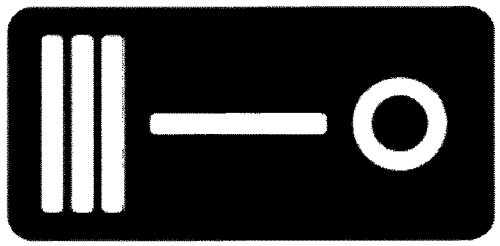
Figure 3A:
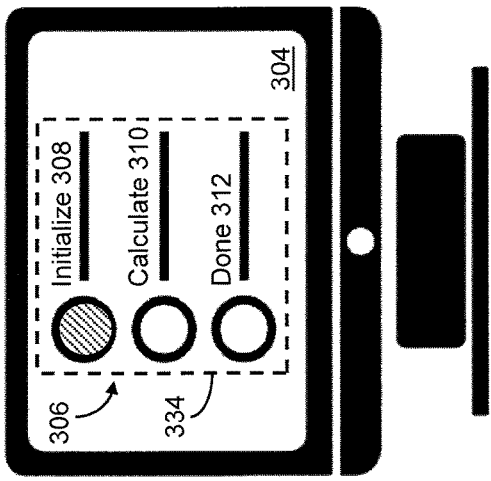
Figure 3B:
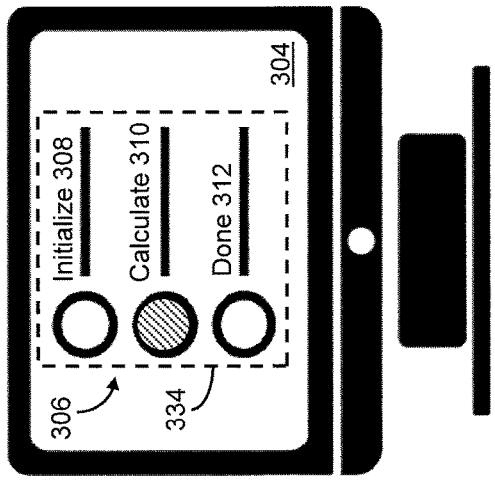
Figure 3C:
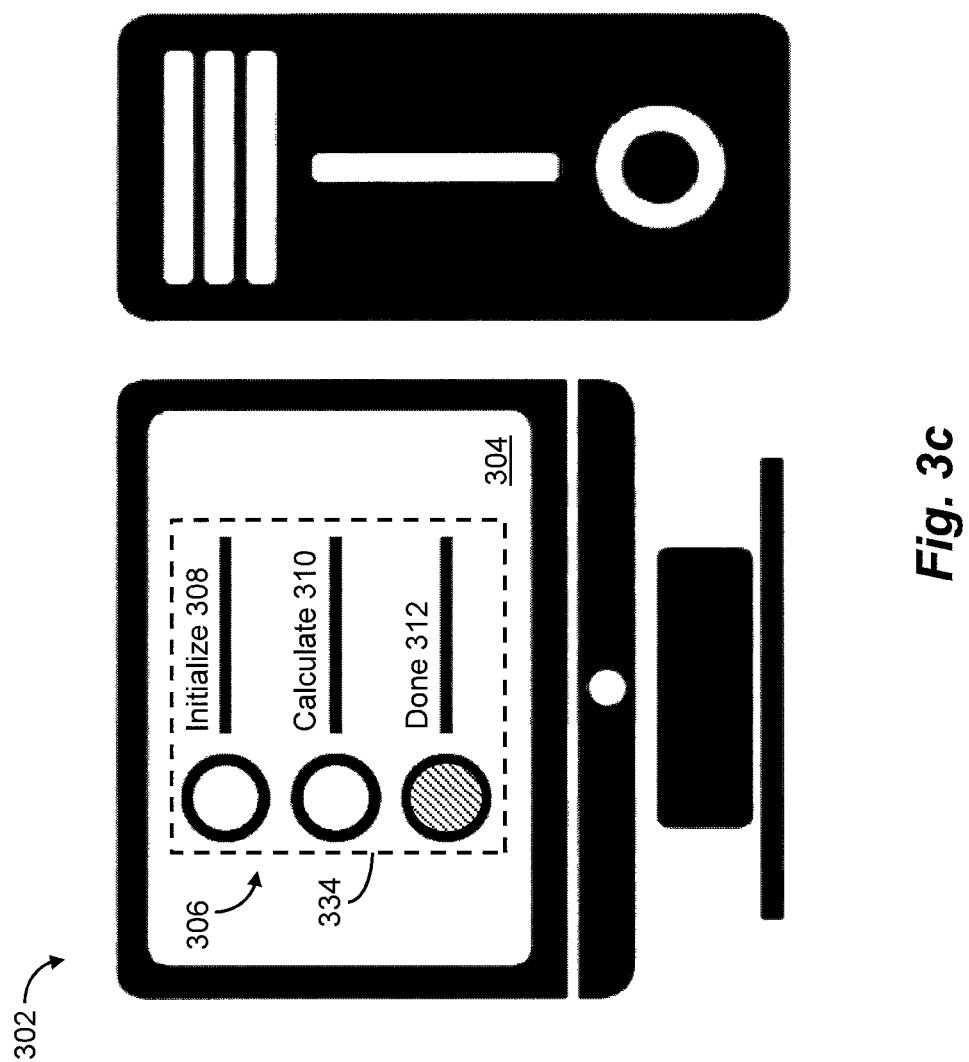

In one embodiment, the display area selector 158 (see FIG. 1c) can be configured to receive user input commands provided via a mouse device, a keyboard, the display screen 304 configured as a touchscreen, and/or any other suitable hardware/software arrangement for receiving user input commands specifying a defined area of the display screen 304. For example, the business owner or employee may specify a defined area 334 (see FIGS. 3a-3c) of the display screen 304 by dragging a cursor along the display screen 304 to create a box or perimeter of the defined area, inputting coordinates using keystrokes into a menu or submenu to specify the defined area, or any other suitable technique. The defined area 334 of the display screen 304 can encompass a group of status indicators 306 (see also FIGS. 3a-3c within the desktop environment of the office computer 302. As shown in FIGS. 3a-3c, the group of status indicators 306 can include an "Initialize" status indicator 308, a "Calculate" status indicator 310, and a "Done" status indicator 312, each such status indicator being indicative of the progress of the application program executing on the office computer 302. It is noted that an enlarged view of the specified defined area 334 of the display screen 304 is depicted in FIGS. 3a-3c for clarity of illustration. Once the business owner or employee specifies the defined area 334 of the display screen 304, the display area selector 158 obtains and saves the display coordinates of the defined area 334 on the display screen 304. In addition, to facilitate the capture of bitmap data corresponding to the defined area 334 of the display screen 304, the display area selector 158 can be further configured to maintain any window of the desktop environment that may contain the defined area 334 in a topmost display position on the display screen 304, during at least the current period of execution of the application program on the office computer 302.

Having specified the defined area 334 of the display screen 304, the business owner or employee interacts with the notification trigger manager 152 (see FIG. 1c) of the notification module 148 running on the OS 136 of the office computer 302 to set a notification policy for determining whether to notify him or her of a change within the defined area 334 during the execution of the application program. In one embodiment, the notification trigger manager 152 can be configured to cause a dialog box (not shown) to be displayed on the display screen 304, listing several possible notification policy options such as notifying the business owner or employee in the event at least a portion (e.g., an image) of the display screen 304 within the defined area 334 starts changing, stops changing, changes to substantially match a display image. (e.g., a predefined image), and/or any other suitable notification policy option.

Figure 2:
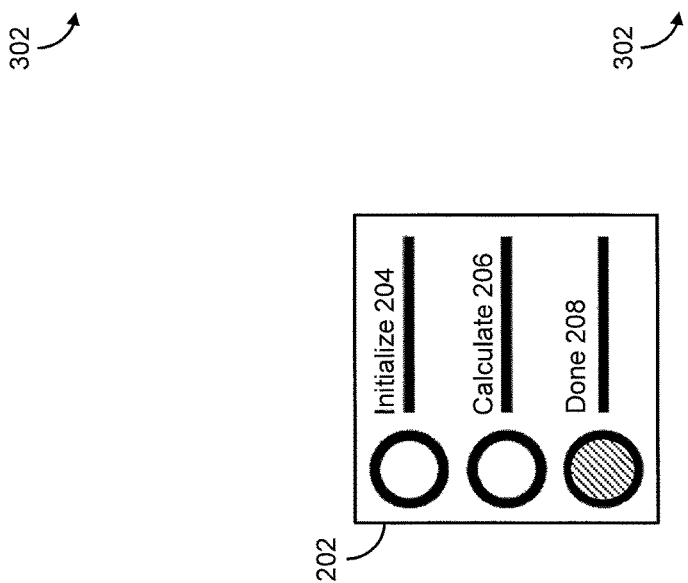
FIG. 2 is a diagram illustrating a display image corresponding to a specified defined area of the display screen of a remote computer.

In this example, the business owner or employee (e.g., via a mouse input, a keyboard input, a touchscreen input) selects the notification policy option "(iii)" (as defined hereinabove), and selects or otherwise provides an image 202 (see FIG. 2) to the notification trigger manager 152 for use as a notification trigger. As shown in FIG. 2, the image 202 contains a representation of a group of status indicators, namely, an "Initialize" status indicator 204, a "Calculate" status indicator 206, and a "Done" status indicator 208 corresponding to the "Initialize" status indicator 308, the "Calculate" status indicator 310, and the "Done" status indicator 312, respectively, encompassed by the specified defined area 334 of the display screen 304. For example, the business owner or employee may have obtained the image 202 by taking a screenshot of the group of status indicators (i.e., the "Initialize", "Calculate", and "Done" status indicators 204, 206, 208) at the completion of a previous period of execution of the application program on the office computer 302 (at which time the "Done" status indicator 208 was asserted, and the "Initialize" and "Calculate" status indicators 204, 206 were de-asserted), converted image data of the screenshot to bitmap data, and saved the bitmap data of the screenshot in a bitmap format file for use during the current period of execution of the application program on the office computer 302.

In one embodiment, the notification trigger manager 152 (see FIG. 1c) can be configured to store bitmap data for several different images (including, e.g., the image 202; see FIG. 2) pertaining to the application program, and to provide a dialog box (not shown) from which the business owner or employee can select the desired image 202 as the notification trigger. In another embodiment, the notification trigger manager 152 can be configured to receive the bitmap format file containing the image 202 (or any other suitable image) from the business owner or employee. It is noted that the business owner or employee (e.g., via a mouse input, a keyboard input, a touchscreen input) can alternatively select the notification policy option "(i)" or the notification policy option "(ii)", each as defined hereinabove, or any other suitable notification policy option for determining whether to notify him or her of a change within the defined area 334 of the display screen 304 during the current period of execution of the application program.

Once the desired notification policy option has been selected by the business owner or employee, the display change detector 160 of the detection module 150 (see FIG. 1c) running on the OS 136 of the office computer 302 operates as a background process to monitor changes within the specified defined area 334 of the display screen 304. In response to the business owner or employee's selection of the notification policy option "(iii)" (i.e., the policy of notifying him or her in the event the defined area 334 changes to substantially match the image 202), the background process of the display change detector 160 periodically captures bitmap data corresponding to the defined area 334 and compares the captured bitmap data with the bitmap data of the image 202 (i.e., the notification trigger) to determine or otherwise obtain a percentage of similarity between the respective bitmap data.

In one embodiment, the display change detector 160 is configured to compare the obtained similarity percentage with a threshold (e.g., a threshold of 95%, or any other suitable percentage value) to determine whether or not the selected notification policy "(iii)" has been triggered. For example, the display change detector 160 may capture, at a first time period, the bitmap data corresponding to the defined area 334 illustrated in FIG. 3a (in which the "Initialize" status indicator 308 is asserted, and the "Calculate" and "Done" status indicators 310, 312 are de-asserted), compare the captured bitmap data with the bitmap data of the image 202 to obtain the percentage value, compare the percentage value with the threshold (e.g., 95%), and determine that the percentage value is less than 95%, thereby indicating that the selected notification policy "(iii)" has not been triggered. Similarly, the display change detector 160 may capture, at a second time period, the bitmap data corresponding to the defined area 334 illustrated in FIG. 3b (in which the "Calculate" status indicator 310 is asserted, and the "Initialize" and "Done" status indicators 308, 312 are de-asserted), and ultimately determine that the percentage value is again less than 95%, thereby indicating that the selected notification policy "(iii)" has not been triggered.

However, at a third time period, the display change detector 160 may capture the bitmap data corresponding to the defined area 334 illustrated in FIG. 3c (in which the "Done" status indicator 312 is asserted, and the "Initialize" and "Calculate" status indicators 308, 310 are de-asserted), and ultimately determine that the percentage value is equal to or greater than 95%, thereby indicating that the selected notification policy "(iii)" has been triggered. It is noted that, if the business owner or employee alternatively selects the notification policy option "(i)" (i.e., the policy of notifying him or her in the event at least a portion of the defined area 334 starts changing) or the notification policy option "(ii)" (i.e., the policy of notifying him or her in the event at least a portion of the defined area 334 stops changing), then the background process of the display change detector 160 can periodically monitor for changes in the bitmap of the specified defined area 334 of the display screen 304 during the execution of the application program to detect whether or not at least a portion (e.g., an image) of the defined area 334 has started changing or has stopped changing, thereby indicating whether or not the selected notification policy "(i)" or "(ii)" has been triggered. In this example, by selecting the notification policy option "(i)" or "(ii)", the acts of comparing captured bitmap data with bitmap data of an image to obtain a percentage value, and comparing the percentage value with a threshold to determine whether or not the selected notification policy has been triggered, can be avoided.

Once the display change detector 160 has determined that the selected notification policy "(iii)" has been triggered (i.e., the defined area 334 of the display screen 304 (see FIG. 3c) has changed to substantially match the image 202 (see FIG. 2)), the notification generator 154 (see FIG. 1c) of the notification module 148 running on the OS 136 of the office computer 302 generates a notification packet containing information pertaining to at least the notification of the change in the display screen 304 (e.g., a notification event type, a notification event name, a timestamp indicating the time of occurrence of the notification event, image or bitmap data representative of the notification trigger) and/or the establishment of a connection to the office computer 302 (e.g., the IP address of the office computer 302, a domain name associated with the IP address, information for constructing/rendering a shortcut (or launch) icon, the security fast-launch token). The notification generator 154 provides the notification packet (including the security fast-launch token) to the notification delivery component 156.

Before delivering the notification packet to the business owner or employee's mobile device 314, the notification delivery component 156 (see FIG. 1c) of the notification module 148 running on the OS 136 of the office computer 302 validates the identity of the business owner or employee using a copy of the security subscription token stored in the subscriber store 132 (see also FIG. 1c), as described in detail later in this disclosure with further reference to FIG. 4a. Once the business owner or employee's identity has been validated, the notification delivery component 156 encrypts the notification packet, and transmits, sends, pushes, or otherwise delivers (e.g., as a TCP/IP communication) the notification packet to the mobile device 314.

Upon receipt of the notification packet at the mobile device 314, the processing unit (or units) 116 (i) decrypts the notification packet, (ii) extracts, from the notification packet, the information pertaining to at least the display change notification and the establishment of a connection to the office computer 302, and (iii) stores the extracted information in the memory 118. Further, the processing unit 116 constructs and renders a shortcut (or launch) icon 318 (see FIG. 3d) on a display screen 316 (e.g., a touchscreen) of the mobile device 314, based on the information for constructing/rendering the shortcut (or launch) icon extracted from the notification packet. As employed herein, the term "shortcut" or "launch" icon refers to a selectable icon associated with one or more particular operations and displayable as an image, a picture, a character, or any other suitable displayable entity on a display screen of a subscriber device. If a user selects (e.g., via a mouse input, a keyboard input, a touchscreen input) the selectable icon on the display screen of the subscriber device, then, in response, the subscriber device can identify and perform the particular operations associated with the selectable icon.

Once the shortcut icon 318 has been constructed and rendered on the display screen 316, the business owner or employee can select the shortcut icon 318 (such as by a finger tap gesture on the display screen 316 within the displayed area of the shortcut icon 318) to perform operations of establishing a connection to the office computer 302 and obtaining fast user access to the desktop environment of the office computer 302, as described in detail later in this disclosure with reference to FIG. 4b. Upon selection of the shortcut icon 318 on the display screen 316, the launcher module 124 (see FIG. 1b) running on the OS 120 of the mobile device 314 provides the security fast-launch token included in the connection information extracted from the notification packet, as well as user credentials (e.g., a PIN, a password, an answer to a security question, biometric information), to the launch authenticator 146 (see FIG. 1c) running on the OS 136 of the office computer 302 for use in determining whether the business owner or employee is authorized to obtain such fast access to the desktop of the remote office computer 302 via his or her mobile device 314.

Once the business owner or employee has been successfully determined to be authorized to obtain fast access to the desktop of the office computer 302 via the mobile device 314, the remote desktop agent 138 (see FIG. 1c) running on the OS 136 of the office computer 302 interacts with the remote desktop client 122 (see FIG. 1b) running on the OS 120 of the mobile device 314 to establish a connection between the office computer 302 and the mobile device 314 over one or more network(s) and/or gateway(s). For example, communications between the office computer 302 and the mobile device 314 via the established connection may conform to the ICA (Independent Computing Architecture) and HDX protocols developed by Citrix Systems, Inc., Fort Lauderdale, Fla. USA, the Remote Desktop Protocol (RDP) developed by Microsoft Corporation, Redmond, Wash. USA, or any other suitable remote presentation protocol(s).

Figure 3E:
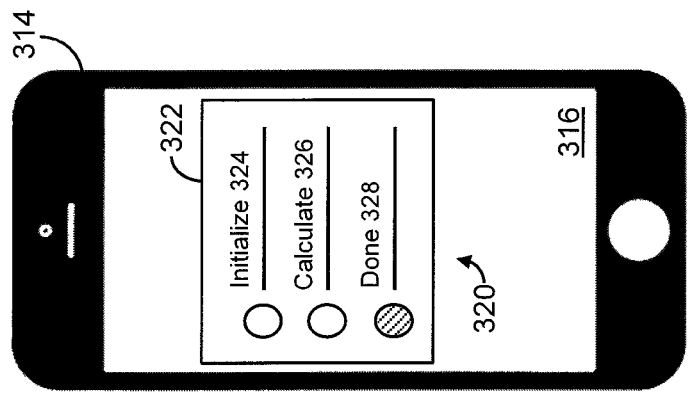
Figure 3D:
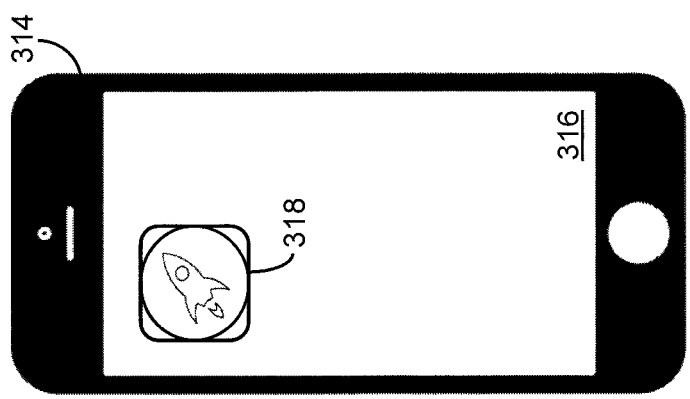

Further, once the connection between the office computer 302 and the mobile device 314 has been established, the remoting module 142 (see FIG. 1c) running on the OS 136 of the office computer 302 provides, to the mobile device 314, desktop graphics data corresponding to at least a portion of the desktop environment of the office computer 302, and the processing unit(s) 116 of the mobile device 314 construct and render a representation 320 (see FIG. 3e) of the desktop of the office computer 302 on the display screen 316 based on the provided desktop graphics data. As shown in FIG. 3e, the representation 320 of the desktop of the office computer 302 can include at least a group of status indicators 322, including an "Initialize" status indicator 324, a "Calculate" status indicator 326, and a "Done" status indicator 328 corresponding to the "Initialize" status indicator 308, the "Calculate" status indicator 310, and the "Done" status indicator 312, respectively, within the specified defined area 334 of the display screen 304 of the office computer 302. It is noted that an enlarged view of the representation 320 of the desktop of the office computer 302 on the mobile device 314 is depicted in FIG. 3e for clarity of illustration. It is further noted that, in this example, because the notification policy option "(iii)" (i.e., the policy of notifying the business owner or employee in the event the defined area 334 of the display screen 304 of the office computer 302 changes to substantially match the image 202) has been selected and subsequently triggered, the representation 320 of the desktop of the office computer 302 on the mobile device 314 includes the group of status indicators 322 with the "Done" status indicator 328 asserted, and the "Initialize" and "Calculate" status indicators 324, 326 de-asserted.

As described herein, the subscription process engaged in by the business owner or employee includes receiving, at the mobile device 314, a security subscription token from the subscription module 144 (see FIG. 1c) running on the OS 136 of the office computer 302. FIG. 4a depicts an exemplary ladder diagram 400a that illustrates the subscription process in detail. The ladder diagram 400a of FIG. 4a involves the mobile device 314 of FIGS. 3d and 3e, as well as the subscription module 144, the notification trigger manager 152, the display change detector 160, the notification delivery component 156, and the subscriber store 132 of FIG. 1c, each of which can be implemented on the office computer 302. As shown in FIG. 4a, the subscription process can start by sending a subscription request (see reference numeral 402) from the mobile device 314 to the subscription module 144. In response to receiving the subscription request, the subscription module 144 can send an authentication request (see reference numeral 404) to the mobile device 314, requesting information pertaining to the mobile device 314, as well as user credentials for the business owner or employee. For example, the device information may include the device type or platform (e.g., iPhone™, Android™, Google™, or Windows™ device type or platform), the device model, the device's operating system version, the device's capabilities and/or features, identifiers of applications installed on the device, etc., and/or any other suitable device information. Further, the user credentials may include a PIN, a password, one or more answers to security questions (e.g., what was the name of your first pet?), biometric information (e.g., fingerprint scan, eye scan, etc.), and/or any other suitable user credential(s).

Figure 4A:
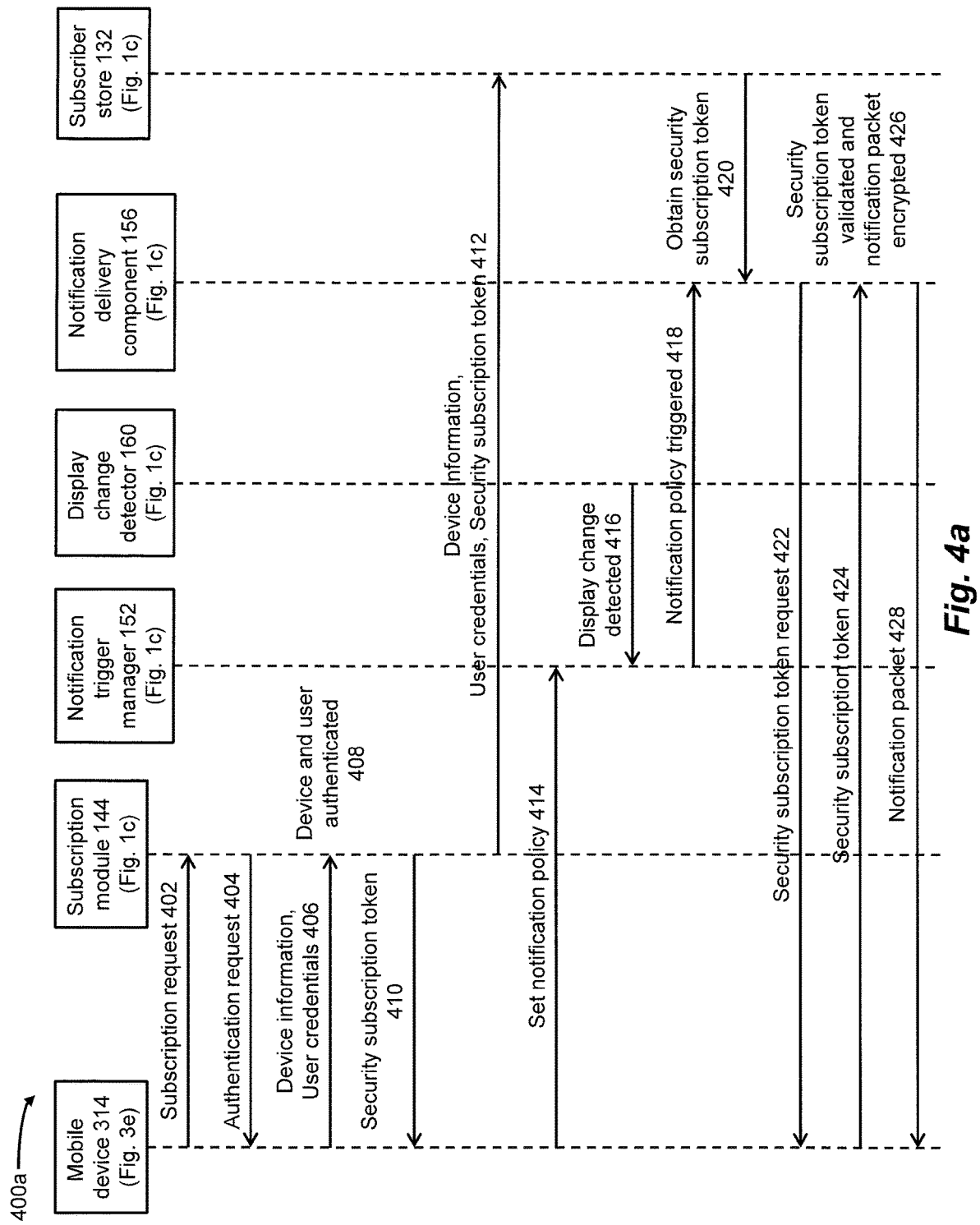
FIG. 4a is a ladder diagram of a first process for subscribing to a notification of a change in the display screen of the remote computer of FIGS. 3a-3c, and ultimately receiving the notification from the remote computer of FIGS. 3a-3c at the subscriber device of FIGS. 3d and 3e.
Figure 4B:
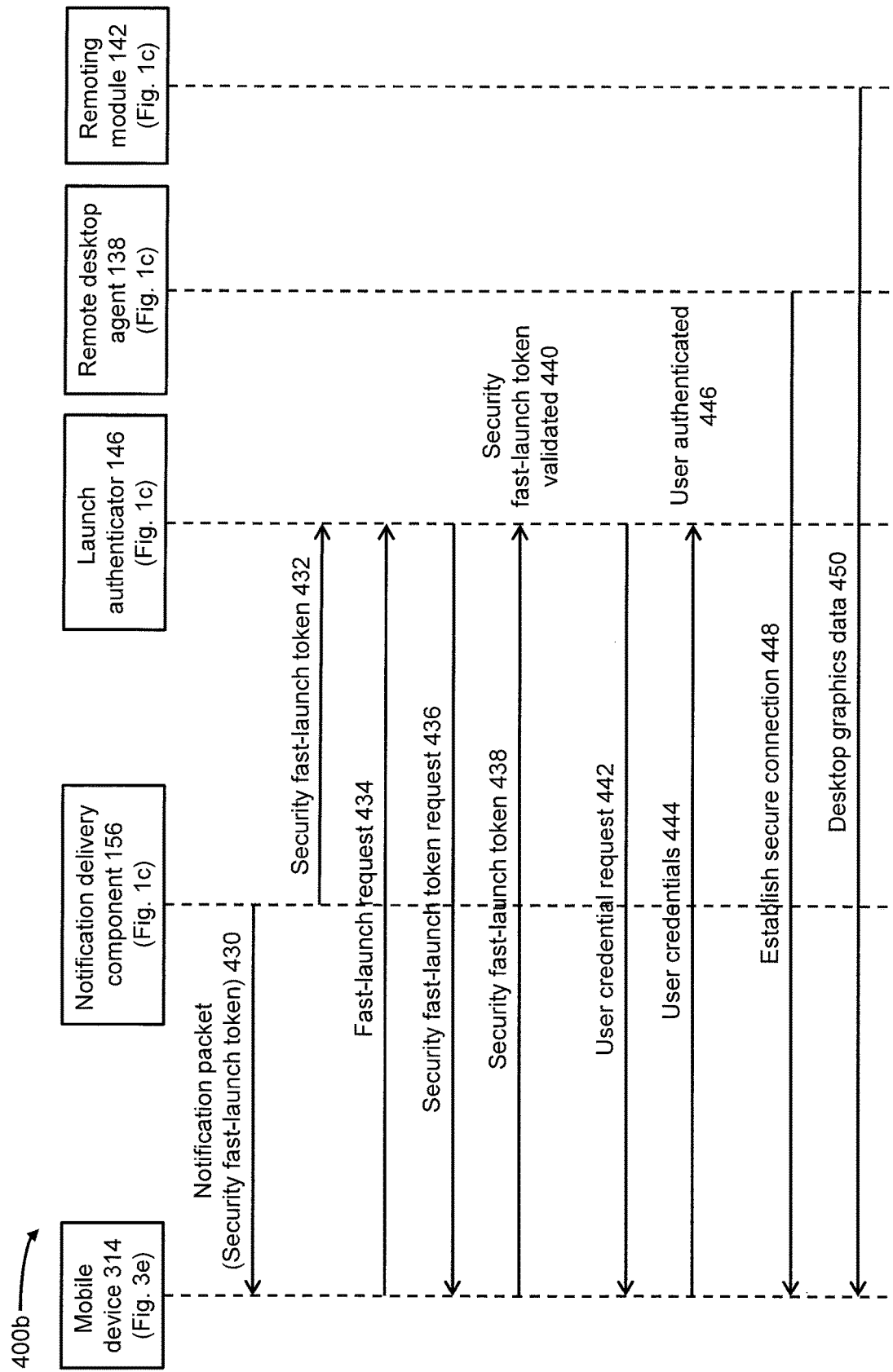
FIG. 4b is a ladder diagram of a second process for establishing a connection between the remote computer of FIGS. 3a-3c and the subscriber device of FIGS. 3d and 3e having received the notification of FIG. 4a at the subscriber device of FIGS. 3d and 3e, and obtaining fast access to the desktop of the remote computer of FIGS. 3a-3c using a security fast-launch token.

As further shown in FIG. 4a, in response to the authentication request, the mobile device 314 can provide the requested device information and user credentials (see reference numeral 406) to the subscription module 144, which authenticates the mobile device 314 and the business owner or employee using the device information and user credentials, respectively. Upon successful authentication of the mobile device 314 and the business owner or employee (see reference numeral 408), the subscription module 144 generates and sends a security subscription token (see reference numeral 410) to the mobile device 314 for storage thereon. The subscription module 144 also sends the device information, the user credentials, and a copy of the subscription token (see reference numeral 412) to the subscriber store 132. Having been successfully authenticated, the business owner or employee can interact with the notification trigger manager 152 to set a notification policy (see reference numeral 414) for determining when to notify him or her of a change within the defined area 334 of the office computer's display screen 304. As described herein with reference to this illustrative example, exemplary notification policy options can include notifying the business owner or employee when at least a portion (e.g., an image) of the display screen 304 within the defined area 334 starts changing, stops changing, and/or changes to substantially match an image.

At a later time period, the display change detector 160 informs the notification trigger manager 152 that a display change has been detected (see reference numeral 416), and the notification trigger manager 152 determines that the notification policy set by the business owner or employee has been triggered (see reference numeral 418) based on the detected display change, and informs the notification delivery component 156 accordingly. In response, the notification delivery component 156 obtains the copy of the security subscription token (see reference numeral 420) for the business owner or employee from the subscriber store 132, and sends a security subscription token request (see reference numeral 422) to the mobile device 314. Upon receipt of the security subscription token request, the mobile device 314 sends the security subscription token (see reference numeral 424) for the business owner or employee to the notification delivery component 156 for validation against the copy of the security subscription token obtained from the subscriber store 132. Once the security subscription token has been successfully validated (see reference numeral 426), the notification delivery component 156 encrypts the notification packet (see also reference numeral 426), and sends or pushes, to the mobile device 314, the notification packet (see reference numeral 428) containing the information relating to the change within the defined area 334 of the display screen 304 and the establishment the connection to the office computer 302. In this way, the delivery of the notification packet from the office computer 302 to the mobile device 314 can be accomplished in a secure fashion.

As further described herein, the business owner or employee can select the shortcut icon 318 to establish the connection to the office computer 302, and to obtain fast user access to the desktop environment of the office computer 302. FIG. 4b depicts an exemplary ladder diagram 400b that illustrates a process for establishing a connection to the office computer 302, and obtaining fast access to the desktop of the office computer 302 using the security fast-launch token. The ladder diagram 400b of FIG. 4b involves the mobile device 314 of FIGS. 3d and 3e, as well as the notification delivery component 156, the launch authenticator 146, the remote desktop agent 138, and the remoting module 142, each of which can be implemented on the office computer 302. As shown in FIG. 4b, the process can start by sending or pushing the notification packet (including the security fast-launch token) (see reference numeral 430) from the notification delivery component 156 to the mobile device 314. The notification delivery component 156 also sends a copy of the security fast-launch token (see reference numeral 432) to the launch authenticator 146. In one embodiment, the security fast-launch token can be a restricted access token configured to expire after a duration of time (e.g., 20 minutes) and/or to limit access to certain features and/or resources of the office computer 302, or any other suitable security or authentication token.

Before the time duration of the security fast-launch token expires, the business owner or employee can select the shortcut icon 318 (such as by a finger tap gesture) on the display screen 316 of the mobile device 314, causing a fast-launch request (see reference numeral 434) to be sent from the mobile device 314 to the launch authenticator 146. In response to receiving the fast-launch request, the launch authenticator 146 sends a security fast-launch token request (see reference numeral 436) to the mobile device 314. Having received the security fast-launch token request, the mobile device 314 sends the security fast-launch token (see reference numeral 438) to the launch authenticator 146, which validates the security fast-launch token against the copy of the security fast-launch token previously provided by the notification delivery component 156.

Once the security fast-launch token has been successfully validated (see reference numeral 440), the launch authenticator 146 sends a user credential request (see reference numeral 442) to the mobile device 314. Having received the user credential request, the mobile device 314 sends the user credentials (see reference numeral 444) of the business owner or employee (e.g., a PIN, a password, an answer to a security question, biometric information) to the launch authenticator 146, which determines, using the user credentials, whether the business owner or employee is authorized to obtain fast access to the desktop of the office computer 302 via the mobile device 314. Once the business owner or employee has been successfully authenticated based on the user credentials (see reference numeral 446), the remote desktop agent 138 operates to establish the connection (see reference numeral 448) between the office computer 302 and the mobile device 314, and the remoting module 142 sends, over the established connection, desktop graphics data (see reference numeral 450) to the mobile device 314 for use in displaying the desktop of the office computer 302 on the display screen 316 of the mobile device 314. As shown in FIG. 3e, the representation 320 of the desktop of the office computer 302 displayed on the display screen 316 can include at least the group of status indicators 322 (i.e., the "Initialize" status indicator 324, the "Calculate" status indicator 326, the "Done" status indicator 328) corresponding to the group of status indicators 306 (i.e., the "Initialize" status indicator 308, the "Calculate" status indicator 310, the "Done" status indicator 312) displayed within the specified defined area 334 of the display screen 304 of the office computer 302. In this way, fast user access to the desktop environment of the remote office computer 302 over the established connection can be achieved in a secure fashion.

Figure 5:
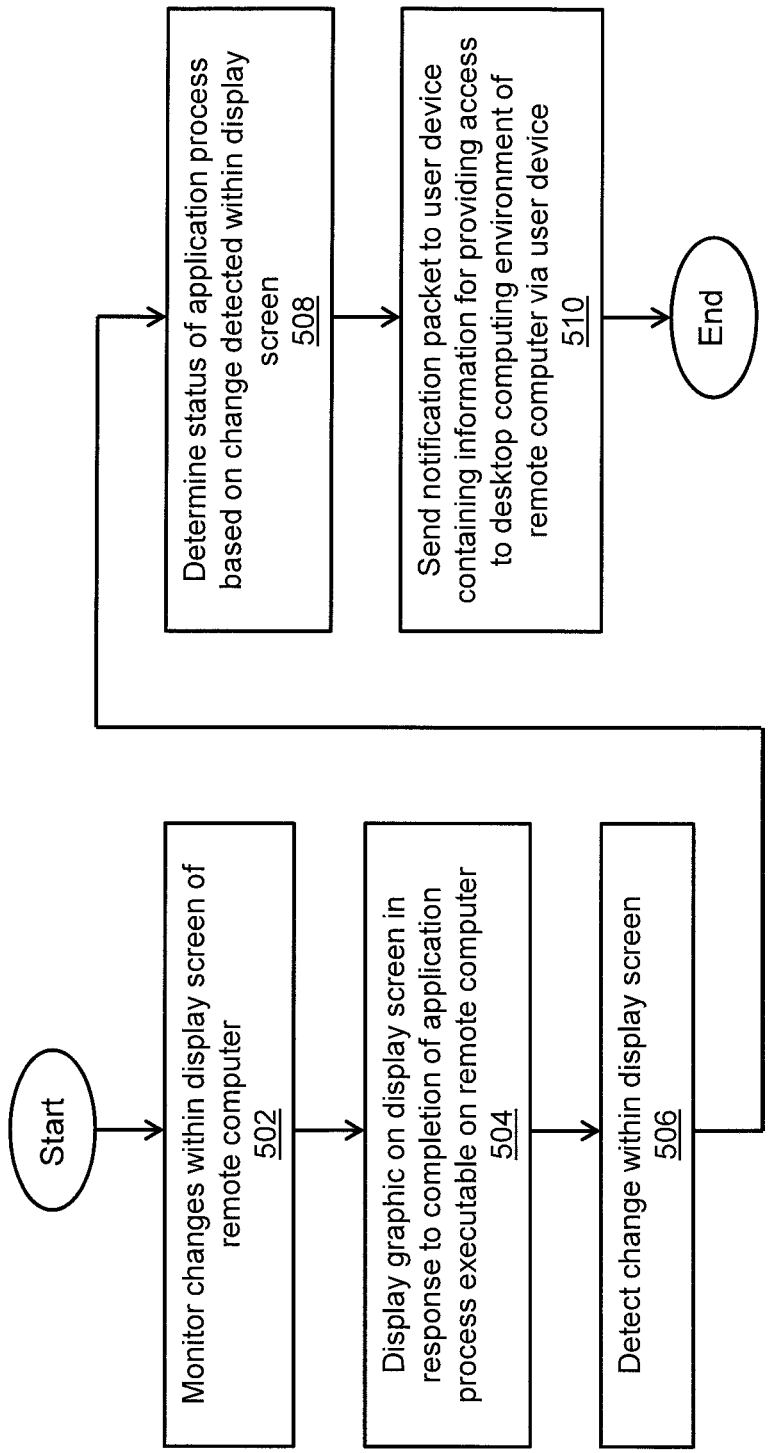
FIG. 5 is a flow diagram illustrating an exemplary method of providing access to a remote computer.

An exemplary method of providing access to a remote computer is described below with reference to FIG. 5. As depicted in block 502, changes are monitored within a display screen of the remote computer. As depicted in block 504, a graphic is displayed on the display screen in response to completion of an application process executable on the remote computer. As depicted in block 506, a change is detected within the display screen. As depicted in block 508, a status of the application process is determined based on the change detected within the display screen. As depicted in block 510, a notification packet is sent to a user device containing information for providing access to a desktop computing environment of the remote computer via the user device.

Figure 6:
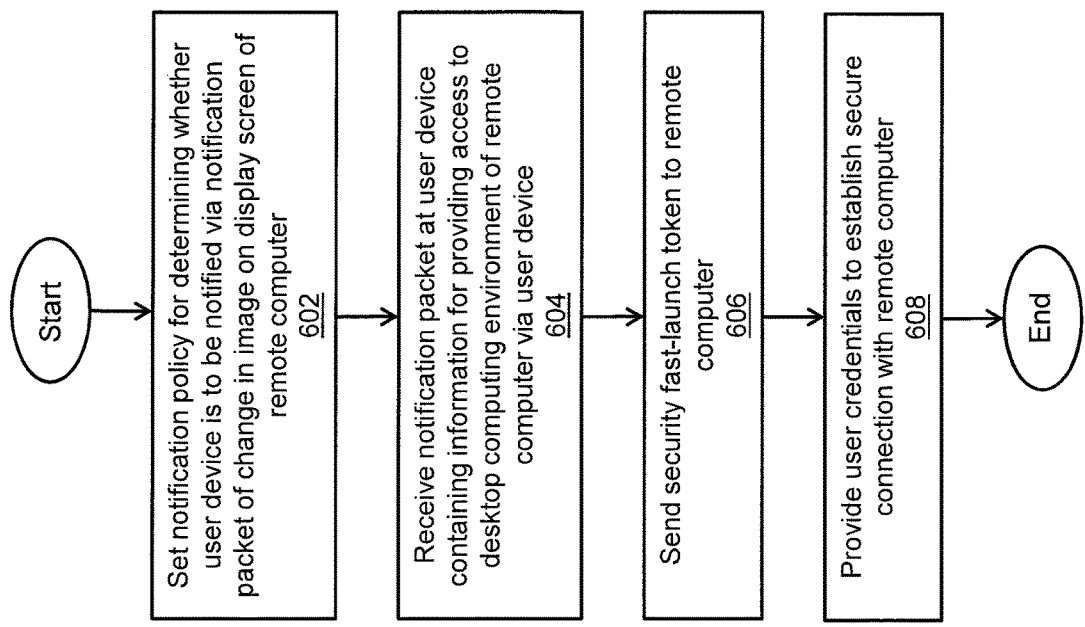
FIG. 6 is a flow diagram illustrating an exemplary method of accessing a remote computer.

An exemplary method of accessing a remote computer is described below with reference to FIG. 6. As depicted in block 602, a notification policy is set for determining whether a user device is to be notified via a notification packet of a change in an image on a display screen of the remote computer. As depicted in block 604, the notification packet is received at the user device containing information for providing access to a desktop computing environment of the remote computer via the user device. As depicted in block 606, a security fast-launch token is sent to the remote computer. As depicted in block 608, user credentials are provided to establish a secure connection with the remote computer.

Having described the foregoing illustrative embodiments, other alternative embodiments and/or variations may be made and/or practiced. For example, it was described herein that the disclosed techniques can be employed in the network environment 100 of FIG. 1a, which can include the subscriber device(s) 102, the remote computer 104, and the networks and/or gateways 106 configured to communicably connect the subscriber device(s) 102 to the remote computer 104. In an alternative embodiment, the disclosed techniques can be employed in a network environment that includes a remote computer implemented as a cloud-based server. In this embodiment, the cloud-based server can be configured to run the Citrix Virtual Apps and Desktops software (or any other suitable software) to provide a thin-client remote display presentation on a subscriber device, which can be installed with the Citrix Receiver™ client component of the Citrix Virtual Apps and Desktops software (or any other suitable client-side component software). Further, the subscriber device can employ the client-side component software to view the desktop (or display screen) of the cloud-based server, to specify a defined area of the desktop (or display screen) of the cloud-based server, and/or to provide an image for use as a notification trigger. In addition, the cloud-based server can employ the Citrix Virtual Apps and Desktops software to detect a change in its desktop (or display screen), and to establish an ICA/HDX session (or any other suitable remote presentation session) to send or push a notification of the change in the desktop (or display screen) to the subscriber device.

It was further described herein that the subscription module 144 and the launch authenticator 146 could be run on the OS 136 of the remote computer 104 (see FIG. 1c). In an alternative embodiment, software constructs providing the functionality of the subscription module 144 and/or the launch authenticator 146 can be run on the OS 120 of the mobile device 102.1, or any other suitable subscriber device.

It was further described herein that an image of a shortcut (or launch) icon could be rendered on the display screen 109.1 of the mobile device 102.1 for providing fast user access to the desktop environment 112 of the remote computer 104. In an alternative embodiment, instead of (or in addition to) rendering the shortcut (or launch) icon or other visual indication on the display screen 109.1, the mobile device 102.1 (or other subscriber device) can be configured to alert a user of a change in the display screen of the remote computer 104 by vibrating and/or emitting an audible sound(s). Further, instead of actuating the shortcut (or launch) icon on the display screen 109.1 to establish a connection between the mobile device 102.1 and the remote computer 104, the user can initiate or establish the connection by a voice command(s), or actuating an existing hardware button, graphical button or icon, or any other suitable hardware/software user interface.

It was further described herein that any window containing the defined area 334 of the display screen 304 of the remote office computer 302 could be maintained in a topmost display position to facilitate the capture of bitmap data corresponding to the defined area 334. In an alternative embodiment, such a defined area of the display screen 304 can be specified in a task bar region (or any other suitable region) at the edge of the display screen 304 to avoid being overlaid by a window or dialog box during execution of the application program on the office computer 302.

Although features have been described herein with reference to particular illustrative embodiments thereof, such features may be included in any of the disclosed embodiments and/or their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk (CD), digital versatile disk (DVD), optical disk, flash drive, solid state drive (SSD), secure digital (SD) chip or device, ASIC, FPGA, and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

As used throughout this document, the terms "comprising," "including," "containing," and "having" are intended to set forth certain items, steps, acts, elements, or aspects of something in an open-ended fashion. Also, as employed herein, the term "group" means one or more of something. This is the case regardless of whether the phrase "group of" is followed by a singular or plural object, or whether it is conjugated with a singular or plural verb. Further, although ordinal expressions, such as "first," "second," "third," and so on, may be used as adjectives herein, such ordinal expressions are used for identification purposes, and, unless specifically indicated, are not intended to imply any ordering or sequence. Thus, for example, a "second event" may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain illustrative embodiments are disclosed herein, it is understood that these embodiments are provided by way of example only, and that the disclosed systems, apparatus, methods, processes, and/or techniques are not limited to these particular embodiments.

While various embodiments of the disclosure have been particularly shown and described, it will be understood by those skilled in the art that various changes in form and details may be made therein without departing from the scope of the disclosure, as defined by the appended claims.

What is claimed is:

1. A method of providing access to a remote computer, comprising:
    specifying a defined area of a display screen of the remote computer within which to detect a change in an image on the display screen of the remote computer;
    determining a status of an application executable on the remote computer based on the change in the image within the specified defined area of the display screen of the remote computer; and
    having determined the status of the application, sending, to a user device, a notification packet containing information to establish a secure connection from the user device to the remote computer, the secure connection providing viewable access to a desktop computing environment of the remote computer via a display screen of the user device.

2. The method of claim 1 further comprising:
    setting, in response to a user input, a notification policy for determining whether to notify the user device of the change in the image within the specified defined area of the display screen of the remote computer.

3. The method of claim 2 wherein the setting of the notification policy further includes setting the notification policy to one of notifying the user device when at least a portion of the display screen of the remote computer within the specified defined area starts or stops changing.

4. The method of claim 2 wherein the setting of the notification policy further includes setting the notification policy to one of notifying the user device when a portion of the display screen of the remote computer within the specified defined area changes to match a predefined image.

5. The method of claim 4 wherein the determining of the status of the application executable on the remote computer includes monitoring for changes within the specified defined area of the display screen of the remote computer.

6. The method of claim 5 wherein the determining of the status of the application executable on the remote computer further includes capturing bitmap data corresponding to the specified defined area of the display screen of the remote computer, and comparing the captured bitmap data with bitmap data of the predefined image to obtain a similarity percentage between the respective bitmap data.

7. The method of claim 6 wherein the determining of the status of the application executable on the remote computer further includes comparing the similarity percentage with a threshold.

8. The method of claim 1 further comprising:
    receiving, at the remote computer, a subscription request for subscribing to a notification event pertaining to the change in the image within the specified defined area of the display screen of the remote computer;
    in response to the subscription request, authenticating one or more of the user device and a user of the user device; and
    having authenticated one or more of the user device and the user of the user device, sending a security subscription token to the user device.

9. The method of claim 8 further comprising:
    sending a security subscription token request to the user device, and, in response to the security subscription token request, receiving, at the remote computer, the security subscription token from the user device.

10. The method of claim 9 further comprising:
validating the security subscription token received from the user device,
wherein the sending of the notification packet to the user device includes sending the notification packet in response to the security subscription token having been validated.

11. The method of claim 1 wherein the sending of the notification packet to the user device includes sending the notification packet that further contains a security launch token.

12. The method of claim 11 further comprising:
having sent the notification packet to the user device, receiving, at the remote computer, a launch request for launching the desktop computing environment of the remote computer on the user device.

13. The method of claim 12 further comprising:
in response to receiving the launch request, sending a security launch token request to the user device, and, in response to the security launch token request, (i) receiving, at the remote computer, the security launch token from the user device, and (ii) validating the security launch token received from the user device.

14. The method of claim 13 further comprising:
having validated the security launch token, authenticating the user of the user device; and
having authenticated the user of the user device, sending desktop graphics data to the user device for use in displaying at least a portion of the desktop computing environment of the remote computer on the user device.

15. A system for providing access to a remote computer, comprising:
a memory; and
at least one processor configured to execute at least one program out of the memory:
to specify a defined area of a display screen of the remote computer within which to detect a change in an image on the display screen of the remote computer;
to determine a status of an application executable on the remote computer based on the change in the image within the specified defined area of the display screen of the remote computer; and
having determined the status of the application, sending, to a user device, a notification packet containing information to establish a secure connection from the user device to the remote computer, the secure connection providing viewable access to a desktop computing environment of the remote computer via a display screen of the user device.

16. The system of claim 15 wherein the at least one processor is further configured to execute the at least one program out of the memory:
to set a notification policy for determining whether to notify the user device of the change in the image within the specified defined area of the display screen of the remote computer.

17. A computer program product including a set of non-transitory, computer-readable media having instructions that, when executed by processing circuitry of a computerized apparatus, cause the processing circuitry to perform a method of providing access to a desktop computing environment of a remote computer, the method comprising:
specifying a defined area of a display screen of the remote computer within which to detect a change in an image on the display screen of the remote computer;
determining a status of an application executable on the remote computer based on the change in the image within the specified defined area of the display screen of the remote computer; and
having determined the status of the application, sending, to the user device, a notification packet containing information to establish a secure connection from the remote computer to the user device, the secure connection providing viewable access to a desktop computing environment of the remote computer via a display screen of the user device.

18. The computer program product of claim 17 wherein the method further comprises:
setting, in response to a user input, a notification policy for determining whether to notify a user device of the change in the image within the specified defined area of the display screen of the remote computer.

19. A method of accessing a remote computer, comprising:
setting a notification policy for determining whether a user device is to be notified via a notification packet of a change in an image within an area of a display screen of the remote computer, the area of the display screen of the remote computer being specified as a defined area within which to detect the change in the image on the display screen of the remote computer, a status of an application executable on the remote computer being based on the change in the image within the specified defined area of the display screen of the remote computer; and
receiving the notification packet at the user device containing information to establish a secure connection from the user device to the remote computer, the secure connection providing viewable access to a desktop computing environment of the remote computer via a display screen of the user device.

20. The method of claim 19 further comprising:
sending a security fast-launch token to the remote computer; and
providing user credentials to establish the secure connection with the remote computer.

* * * * *